US006845316B2

(12) United States Patent
Yates

(10) Patent No.: US 6,845,316 B2
(45) Date of Patent: Jan. 18, 2005

(54) DISTRIBUTION OF TRAFFIC AND TRANSIT INFORMATION

(75) Inventor: Scott C. Yates, Denver, CO (US)

(73) Assignee: Mytrafficnews.com, Inc., Denver, CO (US)

(*) Notice: Subject to any disclaimer, the term of this patent is extended or adjusted under 35 U.S.C. 154(b) by 29 days.

(21) Appl. No.: 10/271,346

(22) Filed: Oct. 14, 2002

(65) Prior Publication Data

US 2004/0073355 A1 Apr. 15, 2004

(51) Int. Cl.[7] ............................ G08G 1/09; G06F 7/00; G06F 165/00

(52) U.S. Cl. ........................ 701/117; 701/119; 340/905

(58) Field of Search ................................ 701/117, 118, 701/119, 200, 207, 214; 340/905, 988, 910, 934, 907, 995.13; 455/412.1, 456.5, 413

(56) References Cited

U.S. PATENT DOCUMENTS

| | | | | |
|---|---|---|---|---|
| 5,173,691 A | * 12/1992 | Sumner | 340/905 |
| 6,233,518 B1 | * 5/2001 | Lee | 701/117 |
| 6,236,933 B1 | * 5/2001 | Lang | 701/117 |
| 6,304,758 B1 | * 10/2001 | Iierbig et al. | 455/456.5 |
| 6,353,792 B1 | * 3/2002 | Murthy | 701/117 |
| 6,539,302 B1 | * 3/2003 | Bender et al. | 701/202 |
| 2002/0194170 A1 | * 12/2002 | Israni et al. | 707/3 |

OTHER PUBLICATIONS

Publication "Finding the Fast Lane Fast" dated Apr. 2000 about My Traffic Station.

E–mail of traffic alert for "Denver" generated Sep. 21, 2001.

* cited by examiner

*Primary Examiner*—Tan Q. Nguyen
*Assistant Examiner*—Dalena Tran
(74) *Attorney, Agent, or Firm*—Sheridan Ross P.C.

(57) ABSTRACT

An electronic distribution apparatus for distributing traffic and transit information is provided. The central feature of the system is an application that allows both automated and direct input of information related to traffic and transit into at least one structured database and distribution of information specific to an individual from that database via electronic distribution. Specifically, a user can indicate a personal preference for customized information about a particular section of town and a particular transit route, and a time for daily delivery and an electronic device for reception of the customized traffic and transit information. Transit information can refer to information about buses and/or trains, including on-time performance gathered from systems that utilize global positioning satellite systems to track the movements of transit vehicles. Electronic distribution can refer to text and numeric information delivered, for example, by electronic mail, digital pagers, cellular-enabled personal computers, text-capable cell phones and text-to-voice applications. Automated input of traffic and transit data includes speed sensor loops, global positioning satellite systems of transit vehicles, and automated cellular phone location information. A processor is programmed to prepare or process traffic-related data that is stored for later access and dissemination of requested traffic information to the requesting individual using an apparatus and at a time selected by the individual.

24 Claims, 9 Drawing Sheets

DISTRIBUTION OF TRAFFIC AND TRANSIT INFORMATION

FIELD OF THE INVENTION

The present invention relates to providing traffic information and, in particular, to obtaining, processing, storing and distributing traffic information related to traffic in geographical areas and transit information.

BACKGROUND OF THE INVENTION

One of the banes of work is the commute to and from work. In some congested areas of the United States, commutes can take more than an hour one way, adding time away from home and leisure activities. Usually, an individual has numerous routes that can be utilized to travel to and from work. However, commuters are usually creatures of habit and will tend to utilize one particular route. It is not possible to know whether there is a tie up or accident on the individual's chosen route. Often times, even when listening to the radio newscasts, one will not realize that there is an accident or tie up on the chosen route until the individual is not able to deviate from the chosen route. The individual then ends up mired in traffic. Most commuters would opt to take an alternate route if they knew that their chosen route will add more time to their commute. However, the time to receive that information is before and during the commute, but before the commuter finds herself in a high traffic area. Currently, there are no ways of insuring that timely traffic and transit information reaches commuters.

In a commute to an office, most people drive from side streets, to a highway and on to a centrally located office building. While driving to the highway, the commuter may see or hear a traffic report that will allow the commuter the opportunity to avoid the congested traffic. The drive home is different. For a majority of commuters, the highway or major feeder road portion of the commute begins within moments of leaving the workplace. By the time a traffic report is heard on the radio, it is likely too late for the commuter to choose a different travel route. In addition, most workers do not have access to traffic or news reports until the worker is in the car and on the road.

Furthermore, traffic news reports on the radio or television tend to be general and deal with only major highways. There may be other construction, accidents or tie-ups on side streets which also affect the commute. There is no readily accessible way for a commuter to obtain information about the commuter's specific route, including side streets and the current status of transit options.

SUMMARY OF THE INVENTION

In accordance with the present invention, method and apparatus that distribute traffic information including for desired geographic areas and transit information are provided. The apparatus includes a control system that can include one or more processors, computers and/or servers under the control of program code or executable software that, in total, has the functionality to provide requested traffic information to requesting users at predetermined times selected by each of such users. The control system also has data storage including one or more databases that stores each user's information or profile related to identifying the traffic information that the particular user wants to receive, destination information concerning where the requested traffic information is to be sent, time of day information related to when the requested traffic information is to be provided to the user and, preferably, the format in which such traffic information is to be sent/received by the particular user. Hence, such user information is stored for each user of the method and apparatus. In addition to user information, the data storage stores all the traffic information for certain one or more geographic regions, such as one or more cities or metropolitan areas and/or combinations thereof. Each such geographic region is divided into a plurality of categories that can include specific geographic areas or travel routes within the particular region. For example, categories of geographic areas might include different sections of the city (north, south, east, west) and particular highway corridors (major city streets and/or interstate routes). The traffic information that includes transit information can be categorized by its type and identity within that type. For example, the types might include bus transportation and rail line transportation, and with possible different entities providing each such type of transportation.

Traffic-related data can be obtained and input to the control system using or based on such categories. That is, when entering traffic-related data for processing by the control system, in one embodiment, an operator receives the traffic-related data from one or more sources. Through a web interface, traffic-related data is entered by associating such data with a particular category. For example, a traffic accident at one geographic area is entered by using a computer screen input that identifies or is associated with that particular category, such as in the geographic area in which the accident occurred. Once entered, such traffic information is processed using the appropriate software executing on the one or more processors. Such processing can include storing processed traffic information in data storage or the one or more databases. After storage, at the one or more predetermined times, and for each particular user, the same or different subsets of traffic information can be accessed from to the data storage for sending traffic information requested by each user to the destination based on the user's information or profile.

The apparatus can also include automated hardware and/or software for inputting traffic-related data, including transit data, to the control system without, or substantially without, human interaction or intervention. This might be accomplished using traffic-related data gathering systems such as traffic speed sensor loops, global positioning systems employed in transit vehicles and portable or cellular phone location technologies.

The traffic-related data can be collected or received from a wide variety of sources, including: listening to a combination of police scanners, or any official frequency that might have information about incidents that could affect traffic; calling dispatch centers to obtain more detailed traffic information; monitoring information from certain traffic sources, such as governmental transportation sources that might have a web page with speed data information and a service of tow trucks that assist motorists in congested traffic; obtaining relevant traffic information from television or radio stations and, more particularly, for a television station for which there is an established relationship, an operator can monitor several cameras, as well as obtain direct video and audio feed from a traffic helicopter of the TV station, all of which is made available to the control system; receiving voice information from traffic watchers and volunteers, which messages can be digitized into an audio file to the control system for a determination regarding what, if anything, might be included as traffic information; and providing traffic-related data by the users themselves.

The apparatus is also defined to include a plurality of user apparatuses. One or more users of the traffic information utilizes one or more of the user apparatuses to request traffic information that is to be customized or targeted for the particular user. The user apparatuses can include numerous kinds of communication units, including personal computers, laptops and hand-held computer devices. In a preferred embodiment, each user apparatus is capable of communicating over the Internet using a web browser to the control system that is associated with one or more websites. Each user that wants to receive desired traffic information is able to request the information by supplying his/her user information or profile, with at least some thereof being stored as previously described. The traffic information requested can be sent to the same user apparatus that was used in subscribing to the traffic information service. Alternatively, a different destination address or information could be provided that links the requested traffic information for that user to another apparatus, such as an electronic mail device, a digital pager, a cellular-enabled personal computer, a text-capable cell phone and a text-to-voice unit.

In operation, the control system involves use of a website that is accessed by a representative first user using a user apparatus by means of a web browser. This access enables web pages to be displayed on the computer screen of the user apparatus. One or more web pages displayed on the screen solicits user specific information related to what traffic information is to be provided to the first user, when that information is to be sent, the format in which the traffic information is to be sent and destination information, such as the e-mail address of the first user. Using these web pages, the first user enters the requested user information or profile that will be stored by the control system.

Likewise, a second user provides second user information or profile utilizing a second user apparatus that communicates by means of a web browser with the control system through displayed web pages. The second user provides the identification of the requested traffic information to be sent to her/him, including transit information being requested, the time of day when the requested traffic information is to be sent to the second user, the format in which the requested traffic information is to be displayed or provided and the destination information (e.g., e-mail address) of the second user. The second user information is also stored in the data storage. At or about the time of day controlled or selected by the second user, the control system accesses the requested traffic information, which is stored or organized in a way that corresponds to the identification of the traffic information as requested by the second user. For example, at a first predetermined time of day, the second user wants to receive at his/her e-mail address traffic information for first and second geographic areas, as well as transit information associated with a particular bus line, including a specific bus route and bus stops. Accordingly, at the requested predetermined time, the control system accesses one or more subsets of traffic information based on the identification of the requested traffic information associated with the second user information and, after accessing, is able to use certain software in the program code to prepare the requested traffic information for sending to the second user at the e-mail address of the second user.

Each of the plurality of users, including the first and second users, that receive the requested traffic information, which is typically only one or more subsets or portion(s) of all stored traffic information, can utilize such information in connection with their commuter or travel plans.

Based on the foregoing summary, a number of salient features of the present invention are immediately recognized. Traffic information, including related to selected geographic areas, travel routes and transit information, is available to be targeted to a number of different users at one or more predetermined times. Only traffic information requested by the particular user need be sent. Such traffic information enables commuters to make more informed decisions about their commute or other travel plans on the highways and side streets. Travel time can be decreased and unwanted emotions associated with traffic problems can be reduced by using such traffic information. The present invention enables each user to easily register and become a daily subscriber to current traffic information for their particular travel route. The traffic information that is provided is based on numerous and reliable sources, which enhances the accuracy and comprehensiveness of the information being provided.

Additional advantages of the present invention will become readily apparent from the following discussion, particularly when taken together with accompanying drawings.

DETAILED DESCRIPTION

Figure 1:
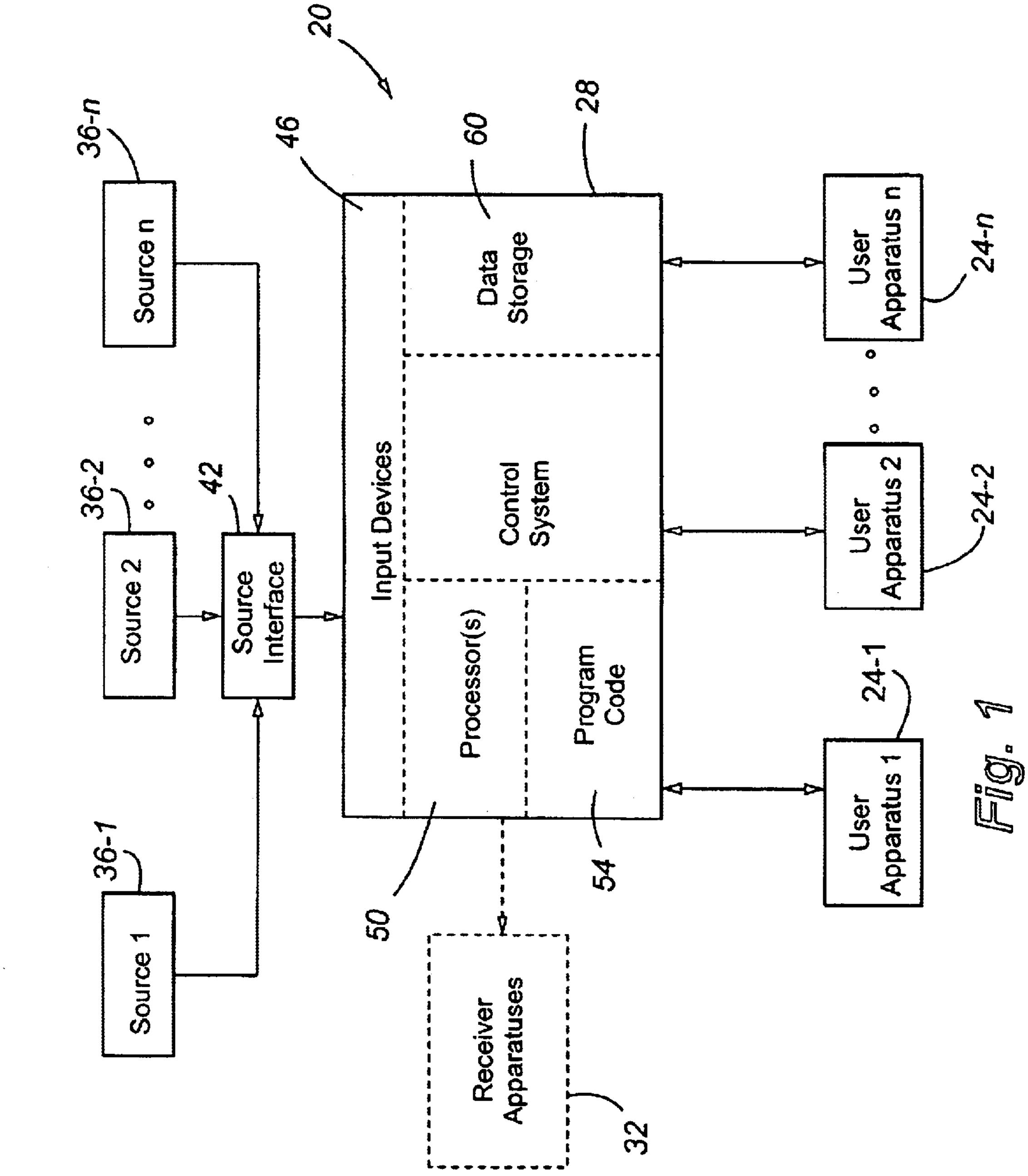
FIG. 1 is a block diagram of major components of an apparatus of the present invention.

With reference to FIG. 1 initially, an embodiment is described for directly distributing traffic information or news to ultimate or potential users of the traffic information. The ultimate or potential users are typically commuters who are drivers of, or passengers in, a vehicle and/or riders who utilize public and/or private transportation, such as buses, trains, taxi cabs, limousine services, etc.

In a preferred embodiment, to become a recipient, the user or individual participant subscribes to receiving the traffic information utilizing the distribution apparatus or system 20 illustrated in the block diagram of FIG. 1. Generally, a web-based implementation for obtaining traffic information and subscribing thereto is realized. The distribution system or apparatus 20 includes a plurality of user apparatuses 24 that can be individually designated as 24-1, 24-2, . . . 24-n. A user apparatus 24 can be any unit or machine capable of providing and receiving information, such as the desired traffic information and might be comprised of computers including personal computers, laptops, hand-held computers, portable or cellular telephones having the necessary computer capabilities, such as sending and receiving e-mails. Preferably, each such user apparatus 24 has the capability of communicating, over wire lines or wirelessly, to a control system 28 using, for example, a web browser. However, other communication apparatuses and communication links are within the scope of the present invention, including voice communications that might not involve the Internet or a web-based communication link.

The control system 28 constitutes the controlling and managing agent or system for receiving traffic-related data and providing traffic information to a plurality of users. The traffic information can be output by the control system 28 to the same user apparatus 24 that was used in subscribing or making the request for such traffic information. Alternatively, one or more users that are to receive the traffic information may employ one or more receiver apparatuses 32 that are different from the user apparatuses or machines 24. Such receiver apparatuses 32 might include electronic mail receiving devices, digital pagers, personal computers, text-capable portable or cellular phones and text-to-voice technology. As can be appreciated, one or more users that receive the requested traffic information might use the same user apparatus 24 that was used in subscribing or such user(s) might use one or more of these different receiver apparatuses 32.

With regard to obtaining or gathering the traffic-related data that corresponds to or is to become the traffic information distributed to the users, a number of sources of such data or other information are preferably used. The sources 36 can be individually identified as 36-1, 36-2, . . . 36-n. The sources 36 can include virtually any human or machine provider of traffic-related data or other information. In one embodiment, such sources can include governmental or quasi-governmental entities involved with transportation, television stations, radio stations, as well as paid and volunteer traffic watchers. The traffic-related data obtained from governmental or quasi-governmental transportation-related entities might involve use of police scanners, calling dispatch centers, and courtesy traffic patrols. These entities might also include city or regional transportation organizations responsible for bus and train lines. In one embodiment, such buses have a Global Positioning System (GPS). Using the GPS, each bus automatically provides to the bus central headquarters its exact location. Using appropriate algorithms, this traffic-related data about the particular position of the bus can be obtained and utilized. For example, if traffic on the highway on which the bus is traveling slows down, such traffic-related data is obtainable based on the GPS information.

When inputting the traffic-related data from the one or more sources 36 to the control system 28, a source interface 42 might be employed. The source interface 42 can be an interface useful in automatically providing traffic-related data to the control system 28. Additionally and/or alternatively, the source interface 42 might include a web-based interface and can involve one or more human operators that input, edit, modify, or otherwise handle the traffic-related data inputting to the control system 28. Regarding direct or automatic inputting of traffic data and/or transit data, the source interface 42 is configured to be compatible or function with a variety of sources that might include speed sensor loops, GPSs of transit vehicles and automated vehicle location technologies. Where an operator functions as a human link between the sources 36 and the control system 28, the operator can use one or more input devices 46 of the control system 28. These one or more input devices can include a keyboard, a mouse, a microphone (voice input technology), or any other device that is useful in inputting traffic-related data for use by the control system 28.

The control system 28 also includes one or more processors 50 and program code or applications software that is executable by the processor or processors 50. The processor (s) 50, under control of the program code 54, prepares, organizes or otherwise processes the inputted traffic-related data in preparing it for desired, later access when at least one or more portions or subsets thereof is to be distributed to the users who have requested traffic information. In that regard, the processor(s) 50 and the program code 54, or at least portions thereof, are involved with registering each user who is subscribing to the traffic information providing service of the present invention. Each such user through his/her user apparatus 24 communicates with the control system 28, including the supplying of user information or a user profile that is to be utilized by the program code 54 in connection with later distribution of traffic information to that particular user.

The control system 28 also includes data storage 60 that can be comprised of one or more databases of electronic or other memory devices, which can be addressable. Data storage 60 stores processed traffic information based on the inputted traffic-related data and also stores the user information that is provided by each user. These will be described further in conjunction with a discussion of an operation of the present invention, particularly related to registering a representative user, obtaining representative traffic-related data, processing such information and accessing that information when desired.

Figure 2:
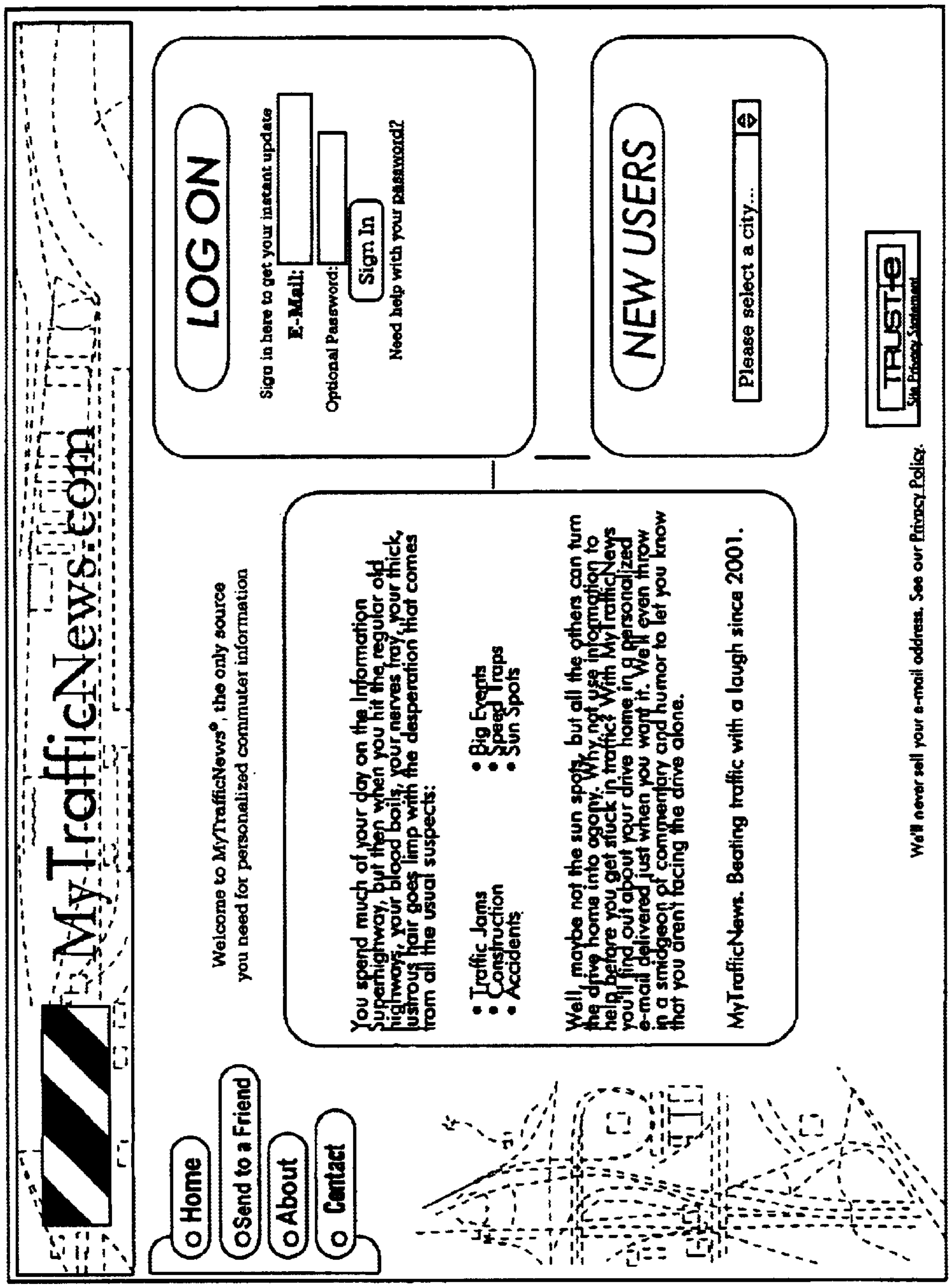
FIG. 2 illustrates a log on procedure for a user that is part of a web page made available to the user on a user apparatus.

Referring to FIG. 2, a web-based embodiment of the present invention is next described. FIG. 2 illustrates a web page from a website associated with the control system 28 and which is viewable by a user on his/her user apparatus 24 or another receiving apparatus 32. This web page can be used in providing new users with recent or instant update traffic information upon the user supplying certain requested information. In particular, to log on, the user inserts her e-mail address in the identified box for that address. An optional input for this log on procedure is a password that the user might wish to utilize. Additional requested information for this log on web page relates to the selection of a geographic region for which traffic information is to be requested, such as one or more cities. If the new user supplies an e-mail address and selects one or more cities or other geographic region(s), the control system 28 can send an instant update of traffic information to the user's e-mail address.

Figure 3:
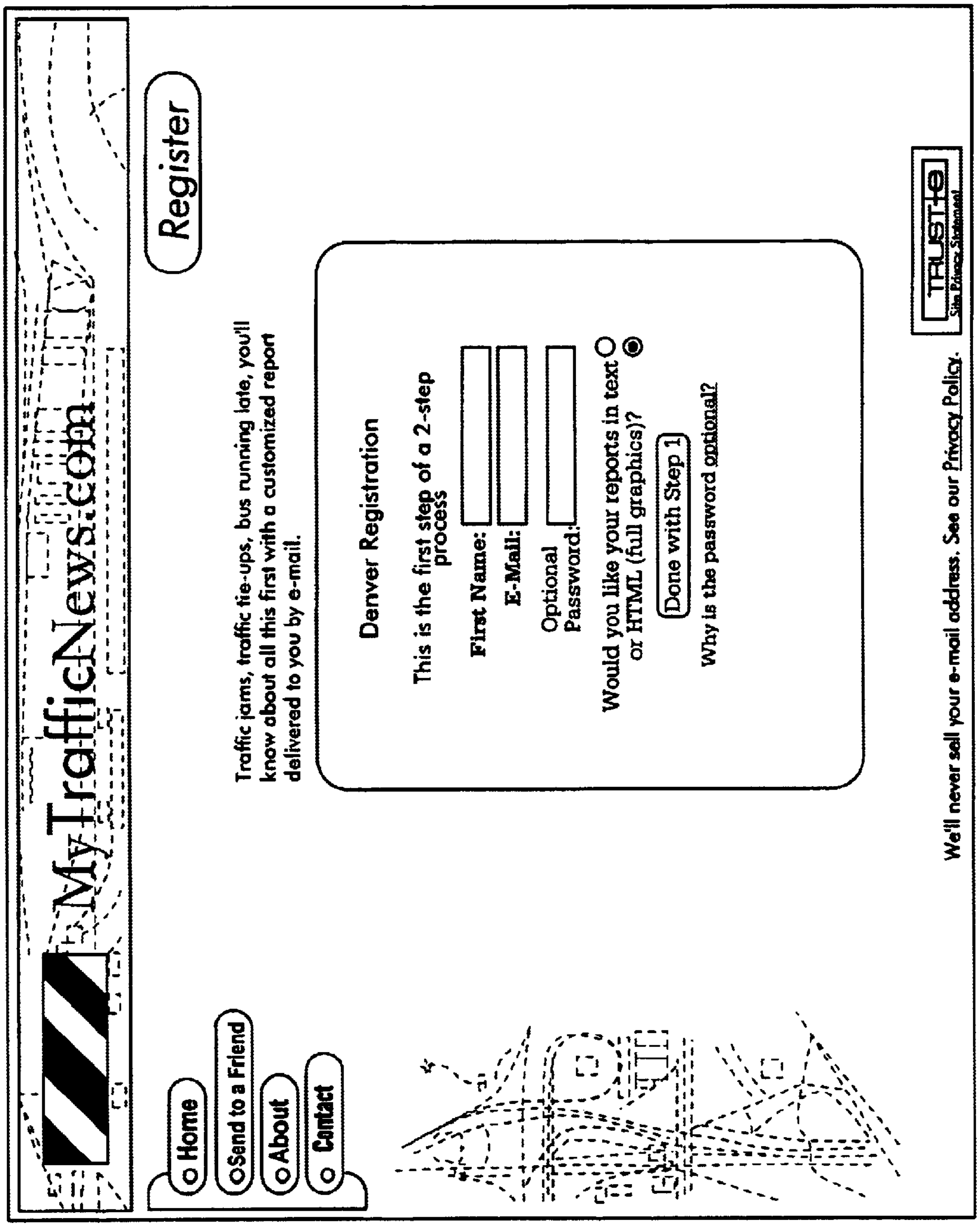
FIG. 3 illustrates portions of a user registration process including related to insertion of destination information and format information for traffic information to, be sent to the user, which is part of a web page displayed on the user apparatus.

Referring next to FIG. 3, another web page is illustrated that can follow the web page of FIG. 2. FIG. 3 relates to subscribing, registering or otherwise requesting traffic information by a user that utilizes the control system 28. In particular, to receive requested traffic information, the user must supply certain user information, at least some of which will be stored and used by the control system in order to distribute the requested traffic information. In this embodiment and the representative example, the registration process applies to a particular geographic region (Denver, Colo. metro area). As indicated in FIG. 3, the user is requested to insert in the identified boxes certain information including the user's first name, the user's e-mail address and an optional password. In one embodiment, the program code is devised so that the user's e-mail address is the identifier used in associating the user with requested traffic information. Insertion of an optional password may not be necessary since a password is usually used to protect the e-mail address from others if the user uses a computer (user apparatus 24) used by others that are unknown to the user. If there is limited access to the computer, such a password is likely not to be inserted or used. The web page of FIG. 3 also asks the user whether the traffic information (traffic news or reports) are to be received in text or, alternatively, HTML (hypertext mark-up language).

Figure 4:
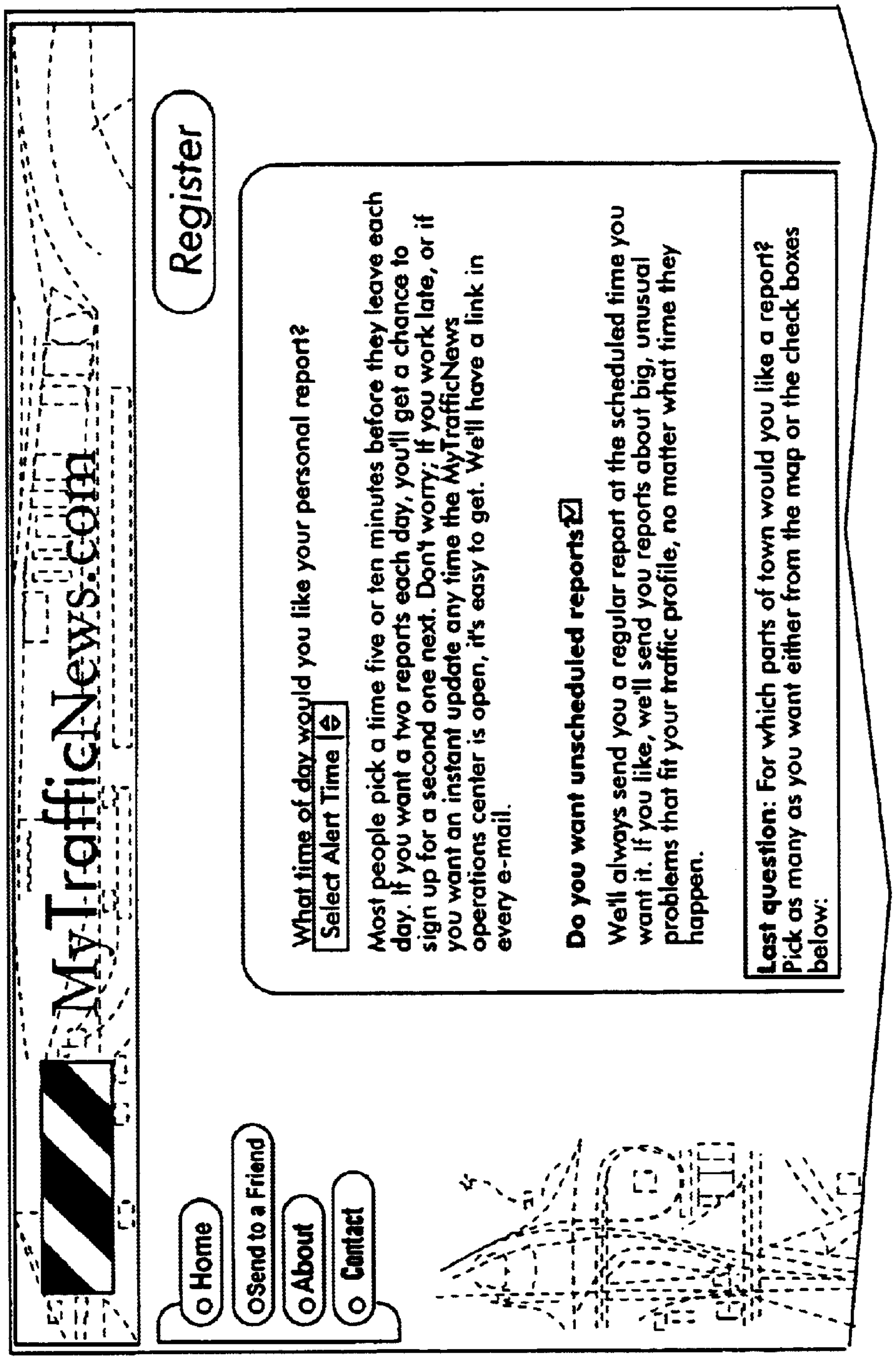
FIG. 4 illustrates another part of the registration process related to identifying the time of day at which traffic information is to be received by the user and which is part of another web page.

The registration process continues with reference to FIG. 4, which illustrates another web page for this implementation. In particular, the user is asked to insert information directed to the time of day that the user wants to receive the traffic information. In this embodiment, the user enters or selects an alert time at which the traffic information will be distributed by the control system 28 to the user. For example, such a predetermined time or times can be close to the time that the user (e.g. commuter) is leaving her work place for home or another destination. In one embodiment, as it concerns the commute after work, users can tailor the e-mail to be sent to them concerning traffic information to any five-minute increment from 2:25 p.m. to 7 p.m. As also indicated in FIG. 4, the user can indicate whether or not she wants to receive unscheduled traffic information. Such a request can be made by providing a check or other indication in the identified box. The unscheduled report might include information on an especially significant event somewhere in the geographic region for which traffic information is requested. Such traffic information would be provided irrespective of the time of day that such an event occurs.

Figure 5:
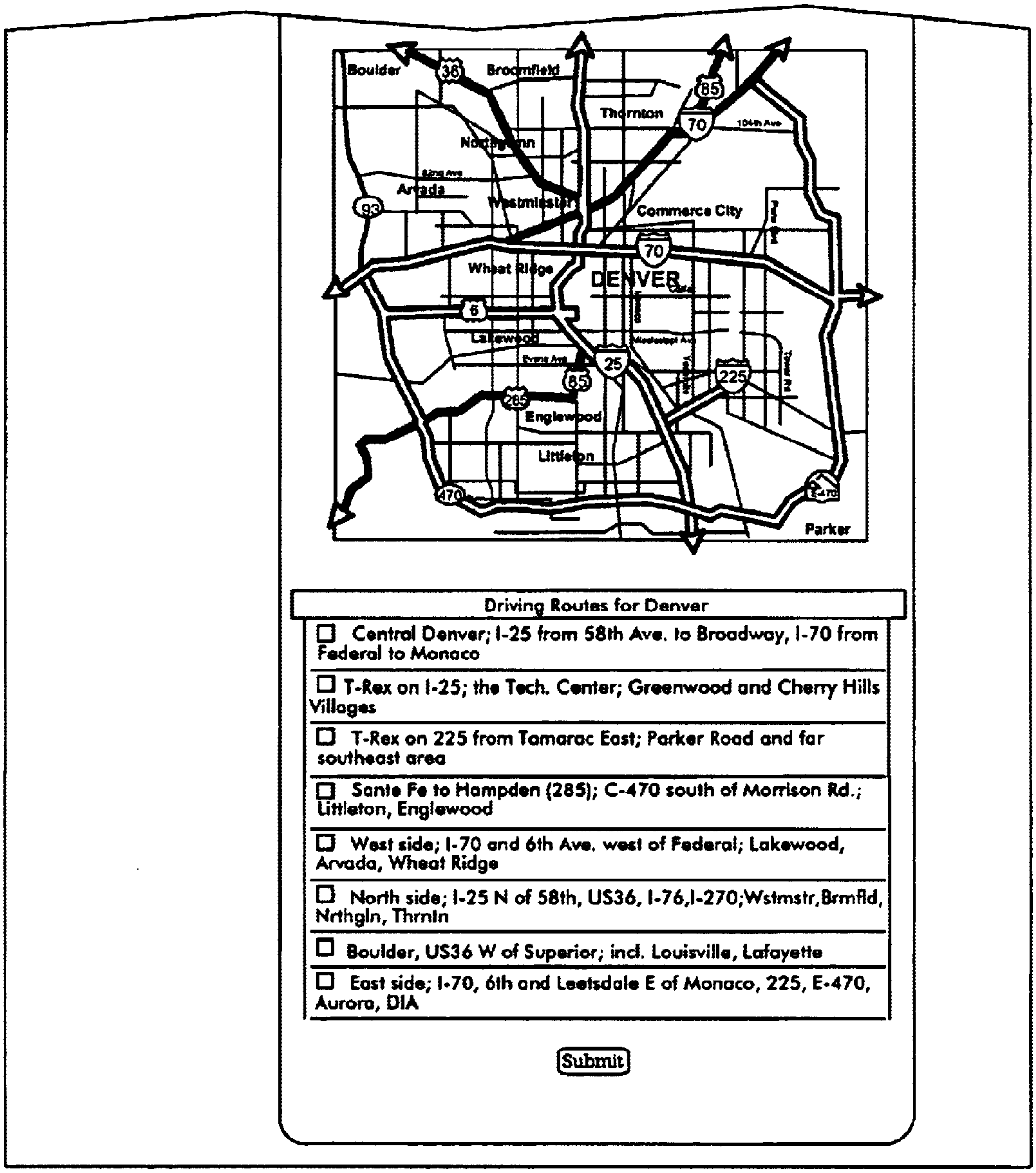
FIG. 5 illustrates yet another part of the registration process involved with identifying by the user the requested traffic information and is also part of a web page.

Key user information that is supplied to the control system 20 by the user apparatus 24 relates to the geographic area or areas for which traffic information is sought by the user. Such user information can be entered or input using the web page illustrated in FIG. 5. In this embodiment, a map of a representative geographic region or metro area is utilized, together with representative routes or travel paths related to the geographic areas. The user identifies for the control system 28 each geographic area for which she wants traffic information. This identification can be accomplished, for example, by selecting or clicking on one or more geographical areas using the displayed map. One or more of those geographical areas can encompass the driving routes that are identified and located next to the selection or insert box. Clicking on a particular geographic area using the map illustrated on this web page, in this embodiment, causes a selection or indication in the box for one or more routes that is part of the geographic area(s) selected from the map. For example, clicking the map at the location of downtown Denver causes a check or other indicator to be provided in the driving route identified beginning with the words "Central Denver." The user is also able to select requested traffic information by checking the box associated with the described geographic area or driving route as noted on the web page of FIG. 5.

Figure 6:
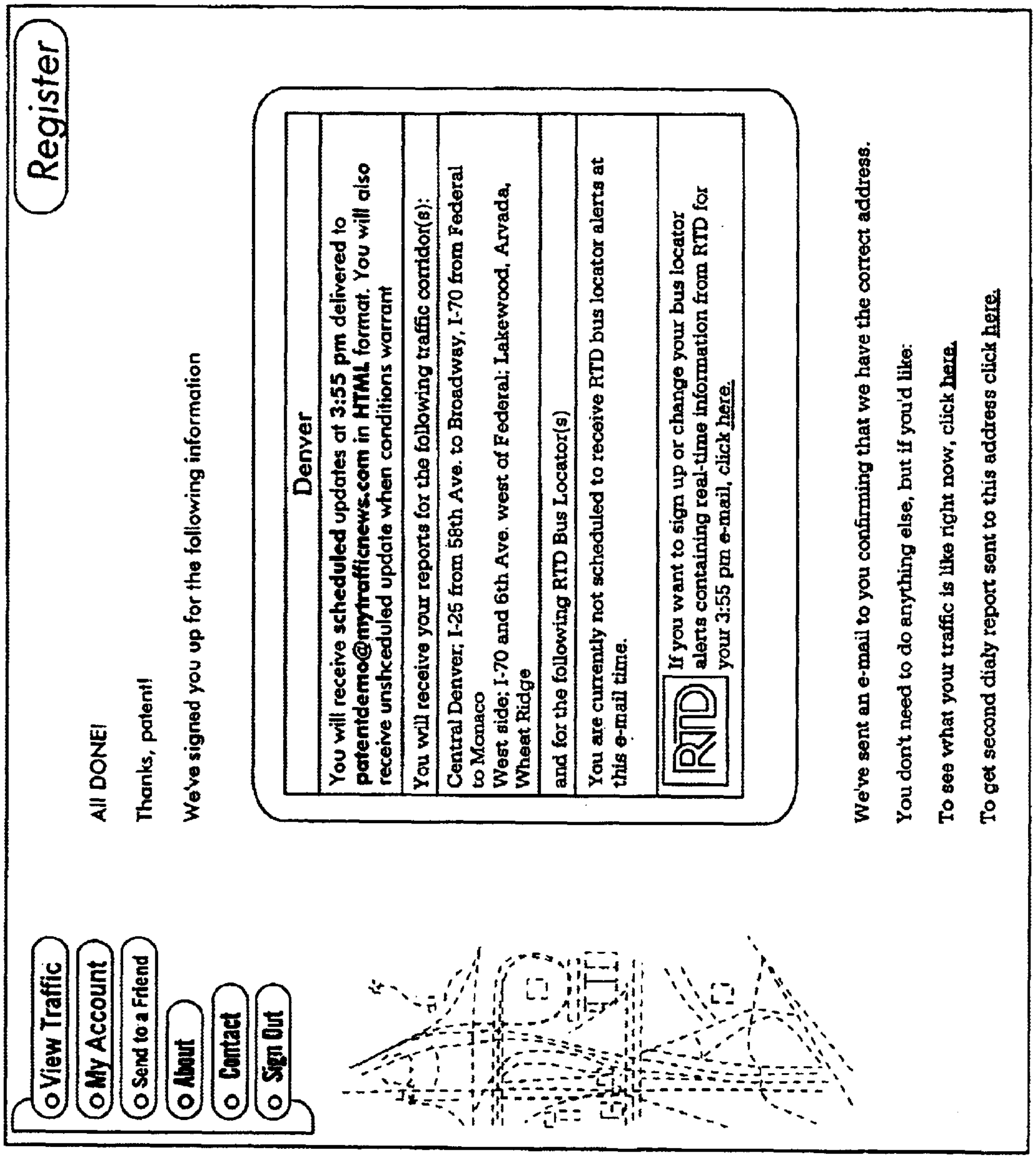
FIG. 6 illustrates part of the registration process in which traffic information is in the form of transit information that can be requested utilizing a web page.

Once the user information is input, the control system 28, after receipt thereof, processes the received user information and generates the web page of FIG. 6 for this particular registered user. Essentially, the user is provided with confirmation information related to the identification of the traffic information that the user will receive, the time(s) of day that traffic information will be sent to this user, the destination information of the requested traffic information (e.g., e-mail address supplied by the user), and the format in which the traffic information is to be received by the user (e.g. HTML). In the case in which this user requests unscheduled updates of traffic information, this will also be noted in the confirmation report of FIG. 6.

Continuing to refer to FIG. 6, additional traffic information can be provided to the user upon request that includes transit information, such as in the form of bus schedules or bus availability information. As noted on the web page of FIG. 6, the user can request such information by selecting or clicking on the "RTD" icon.

Figure 7:
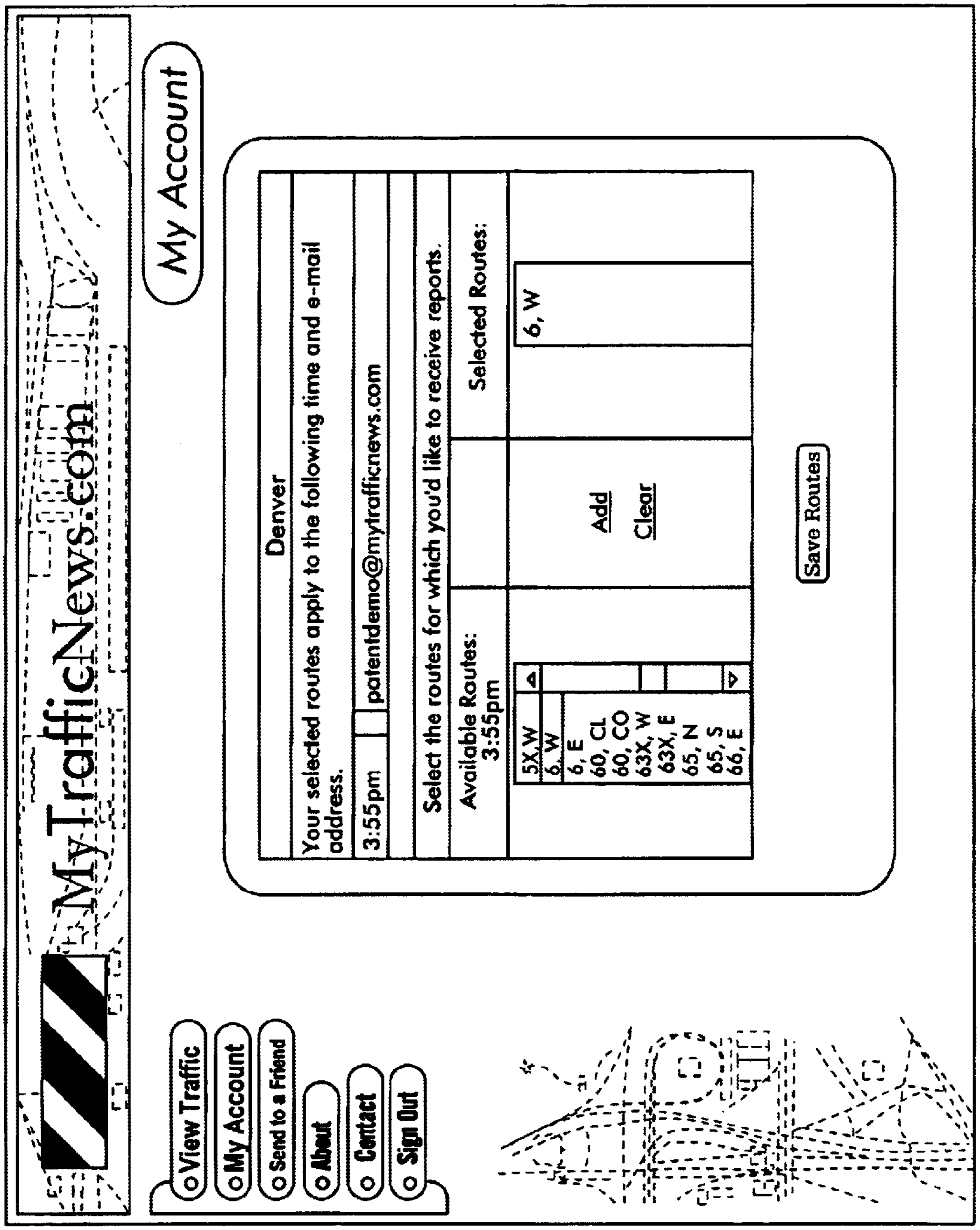
FIG. 7 illustrates a web page by which the user is able to select transit information that the user is to receive related to bus routes.

Referring next to FIG. 7, once the user selects such transit information, the web page of this figure is provided by the control system 28 to the user apparatus. This web page is an illustrative example of bus routes in a particular city (Denver) that the user can choose from in order to obtain traffic information related to such routes. With this web page displayed, the user selects one or more of such routes that constitute further traffic information that is being requested and will be received by the particular user. According to this embodiment, users that are bus riders can choose the bus route that they take. As many as two different bus routes can be selected. The list of bus routes is identified for selection on the left side of the display. In one embodiment, each time the overall bus scheduled is adjusted, the list can be transferred or otherwise obtained from the entity (RTD) responsible for the bus schedules to the website of the control system 28.

Figure 8:
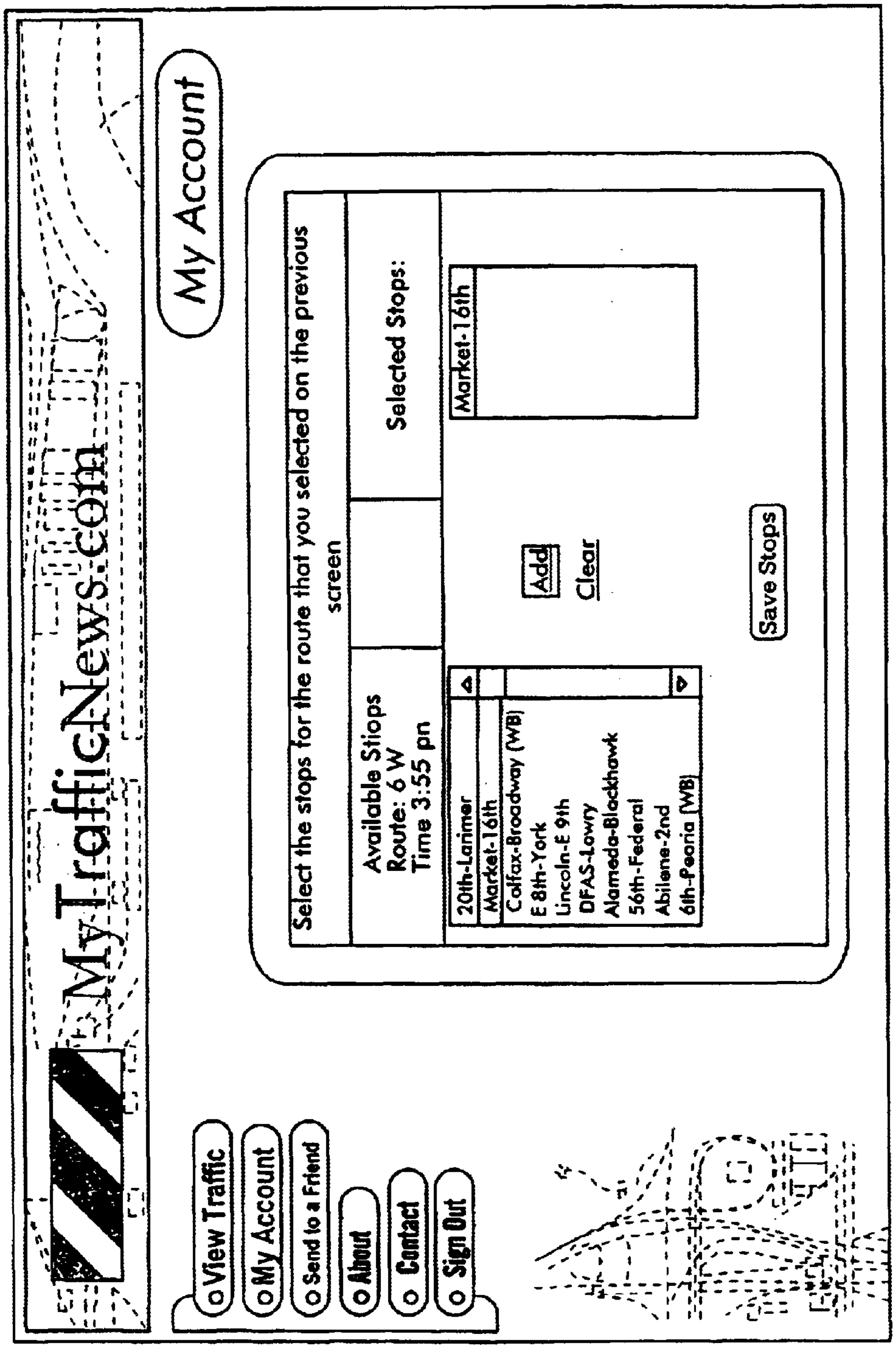
FIG. 8 illustrates a web page on which stops for a bus are identified, including a selected stop.

Referring to FIG. 8, another representative web page is illustrated, which is displayable on the user apparatus 24, after the user has selected the desired bus route(s). As illustrated by this web page, a list of stops for the bus that the user has selected is displayed. The stop information, in this embodiment, is made available by the bus provider (RTD), but such database information is also stored at the control system 28. When a user selects a bus stop, that information accompanies the user's information or profile in the appropriate database of the data storage 60. All such information can be displayed for the user on her user apparatus 24 by selecting the "Save Stops" button.

As discussed, after being registered, the particular user receives traffic information each day at a particular time from the control system 28. Such traffic information is sent using the stored destination information or address, for example, the user's e-mail address. Representative traffic information for a particular user on a certain day at a predetermined time is set out below and can be presented in the desired format by means of an e-mail communication.

Here is your MyTrafficNews Report for Tuesday, Oct. 8, 2002 3:35:02 PM Central Denver:

All of central Denver is gearing up for the big return of the Nuggets this evening . . . OK, maybe not. Actually traffic in this neck of the woods appears to be quite calm, with nothing huge to report for the major thoroughfares. Watch for volume in the Mousetrap, of course, and on I-25 around downtown and I-70 past the Coliseum.—3:28:08 PM An accident was reported at 17th Ave. and St. Paul, right near City Park, at 3:01 p.m.—3:07:02 PM Monaco is getting the heck paved out of it, so watch for lane closures in either direction of Alameda and Cherry Creek Drive North until 3:30 p.m. Of course, even without lane closures, the rotomilling makes this drive as fun as a barrel of monkeys.—2:04:19 PM North Side:

Not much in the way of traffic headaches for most of the north side so far, unless you count construction, in which case it's just as rotten as the rest of town. Watch for that, plus the usual crowding on I-25 as the day wears on.—3:28:31 PM Ah, the life of the flagger: All the sun you can handle and all the songs you can hum to yourself. Watch for them on Highway 224 around I-270 (a diagonal connection between 70th and 74th aves.), and on Washington at I-270 until 3:30 p.m.—2:02:28 PM Still feeling the pinch are US 85 at Bridge Street in Brighton and I-76 at 96th Ave., which are both down one lane all day. Also watch for repair crews around I-76 and 88th Ave. Last but not least, construction on Sheridan starting at 80th Ave. could create some back-ups on the exits to Sheridan on the Boulder Turnpike.—2:02:05 PM 12X-N-Union Station:

The bus that is due at 420 p is now expected to arrive at 420 p

The bus that is due at 450 p is now expected to arrive at 450 p

The bus that is due at 520 p is now expected to arrive at 520 p

Congratulations to all of the participants in the Komen Denver Race for the Cure Sunday! Don't forget that it's all about prevention, and Buddy Check 9 day is coming up Wednesday!

ADVERTISEMENTS (here one or more advertisements from one or more advertisers is displayed)

Tuesday:

It appears work on University finished much faster than expected, as the closure there is not on today's schedule. That's great, but is sure is odd seeing a great big slice of sky where a bridge once was. And lo, as one major operation finishes, another begins. Folks trying to head south past Hampden on I-25 will have some trouble, as at 8 p.m., the two left lanes will be closed from Hampden to Quincy, and at 9 p.m. northbound I-25 at Hampden will be closed completely. Traffic will be diverted to the off-ramp, and then back onto I-25 after, so it's not a gib closure, just an annoying one.

Are you ready for Nuggets basketball? Too bad, it's coming anyway. Tonight kicks off the preseason for your Denver Nuggets. (They must be "your" Denver Nuggets—they certainly aren't ours) The intrasquad Blue and White game starts at 7 p.m. at the Pepsi Center, and we are pretty darn sure that the Nuggets will win. (That's the last time we'll be able to say that this year!) We're not sure how many people this game is going to draw, but the admission is free. Heck, for a free game, we're halfway tempted to hop on the C Line of light rail ourselves to go see the original "stiff," former coach Doug Moe, now working as some kind of vice president of insults. We like to think of Moe as a sort of spiritual godfather of MyTrafficNews, willing as he was to call a stiff a stiff.

So, in the spirt of Moe, we encourage you to yell out. When you see some bozo driving with a cell phone in one hand and a cheeseburger in the other flicking a cigarette butt out the window as he weaves back and forth over the solid white lines in a no-passing zone . . . go ahead, yell out! "Hey, you're a stiff!"

Thanks for reading!

View an instant traffic update using your traffic profile.

View an instant traffic update for the whole metro area.

This has been your free traffic update from MyTrafficNews. Feel free to change your settings or unsubscribe at any time.

As shown in this representative example of traffic information for a particular user, a substantial amount of detail is provided, including requested traffic information. The time stamp after each of the individual alerts indicates what time the report was last modified. The advertisement(s) can contain text and images that are created by the advertiser. The "notes" section at the bottom goes to all users, but is drawn from the data storage 60 in real time and that section can contain information about a major traffic event that could be of interest to all users.

The traffic information that can be included as part of the information being sent to one or more users can be automatically generated data from a government transportation department, for example, that obtains such traffic-related data and publishes it to make it available over the Internet. Such traffic-related data can be collected from one or more speed sensors suitably positioned along different highways. The control system 28 can receive such data in real time and, after appropriate processing thereof, can include it as part of the traffic information being sent to the one or more users. This traffic information can be part of an instant update that is provided to one or more users who have requested such traffic information.

Another form of traffic information available to one or more requesting users includes a photograph or image of a particular geographic area that includes a vehicle travel route, such as a highway. For example, the video feed associated with such an image can be obtained from a traffic helicopter and posted on the website associated with the control system 28 and/or included as part of the traffic information that is sent to the user apparatus 24. This image allows one or more users to visualize a particular travel route and the current status of traffic along a portion of that travel route. One or more images can be sent out to the users within minutes of the video being first shot.

The representative input sent to the particular user apparatus 24 or a particular receiver apparatus 32, includes certain links that the user can select. One of the links is "View an instant traffic update using your traffic profile" that allows the user to go to a web page that draws from the same database of traffic information, but at a time other than that requested by the user. This can be used, for example, if someone receives a report at 4:55 p.m., but is in a meeting that runs until 5:30 p.m. by clicking on or otherwise selecting that link, the user is taken to a web page with the traffic information that fits the user's profile. In that regard, when the user first registered, the control system 28 placed an identifying file (known as a "cookie") in the user's browser. When the user clicks on that link, or any time the user accesses the control system 28 and particularly the website, the cookie directs the user automatically to a page that has traffic information drawn from the database found at the data storage 60 for that user's particular profile. By way of example, the user in the above-representative e-mail has "Central Denver" and "North side" geographical areas designated in the user's traffic profile. By clicking the link, that user would be taken to a page that would draw from the traffic information, including bus information, at the moment of that click and display it within a few seconds. Any new accidents that had been entered into data storage 60 would also be displayed. Any updated information added to any of the previous alerts would also be displayed and available for this user. For the user that has bus-related traffic information in his/her profile, the data storage 60 has real-time information available from the bus provider in order to send the user the latest available on-time information for that user's bus route(s).

As also illustrated in FIG. 8, another link is identified as "View an instant update for the whole metro area." Selection of this link takes the user to a web page that does not match his/her individual regular commuting profile. Rather, it takes the user to a web page with traffic information associated with the entire geographic region available for selection for that particular user. This selection may be made by a commuter that has a destination other than the usual or normal route. When this link is selected, the control system determines all active alerts for the particular geographic region and these are displayed to this user.

There is also a link identified as "change your settings or unsubscribe." When selected, the user receives a web page on which all settings for that user can be changed or where the user can unsubscribe from the service of receiving the previously requested traffic information. When the user unsubscribes, information about the user is completely deleted from the databases of the data storage 60. On this link as well, there is also a "Vacation stop" selection. A user can enter an amount of time up to 90 days that he/she wants to stop receiving the daily e-mail having the requested traffic information. After the number of days that the user specifies on a calendar is completed, sending of the requested traffic information is resumed.

Figure 9:
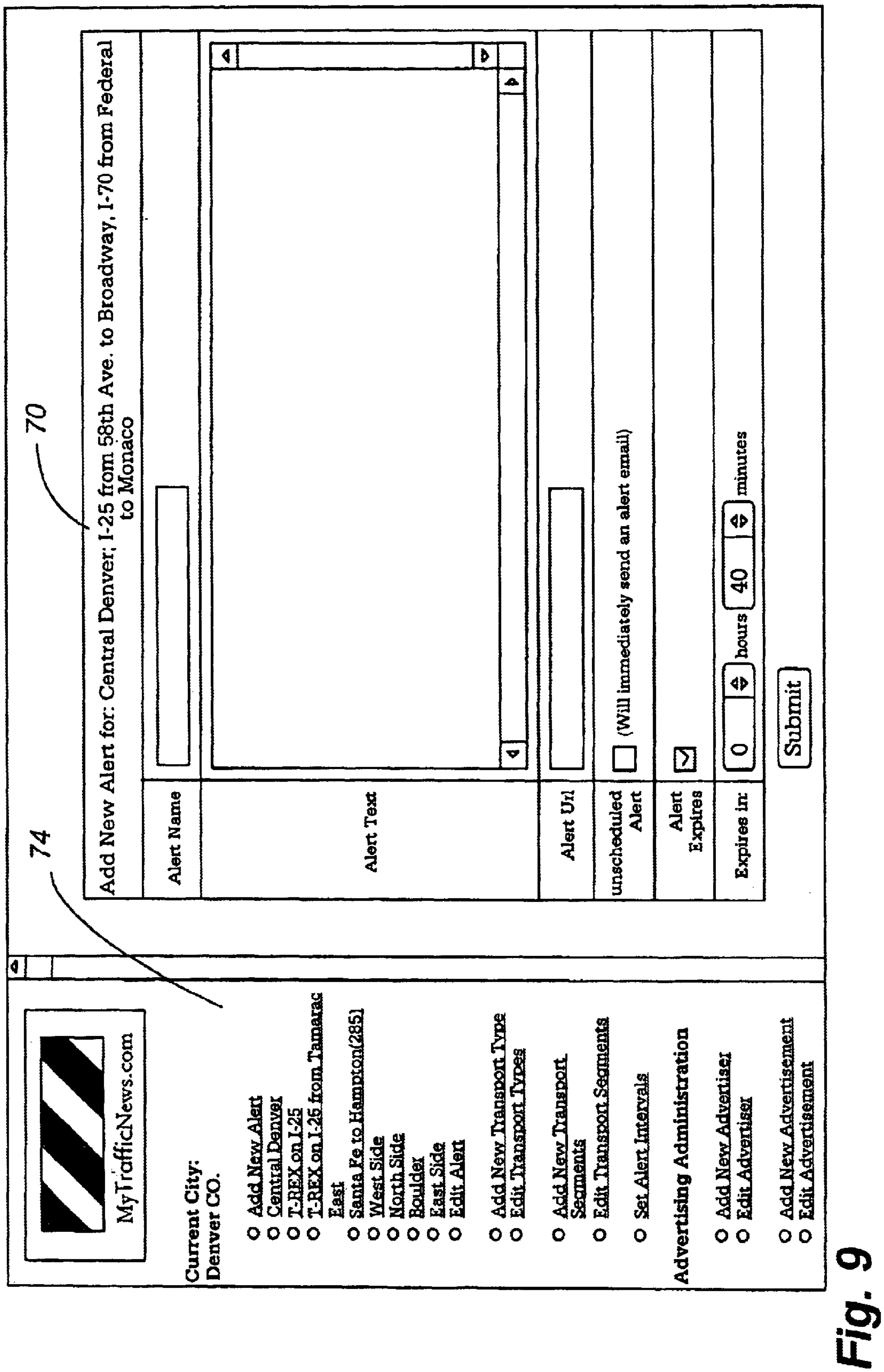
FIG. 9 illustrates portions of a web interface for use in inputting traffic-related data to the control system for processing and data storage.

More description is next provided related to inputting, storing and accessing requested traffic information that is to be sent to registered users utilizing the control system 28. In one embodiment, a substantial majority of traffic-related data that is received from the one or more sources 36 is input using an operator having authorized access to the control system 28. The operator uses an input device and a software-implemented web interface as part of the source interface 42 in order to enter the traffic-related data from the sources 36. With reference to FIG. 9, a computer screen display 70 useful in entering traffic-related data for processing by the control system 28 is illustrated. The display 70 includes a number of categories 74 related to traffic information. These categories include identified geographic areas for a representative geographic region, such as the city of Denver in Colo. These geographic areas categorized in this example include different sections of Denver, a city (Boulder) located near Denver, and geographic areas defined in the context of vehicle travel routes, such as highways. The operator correlates or associates the obtained traffic-related data with one or more predetermined geographic area categories.

By way of example, traffic-related data might be received that relates to a traffic event in the geographic area category identified as "Central Denver." The operator has made a determination that such travel-related data should be associated with the category "Central Denver." To associate such traffic-related data with this category, the operator uses this web interface by selecting or clicking on the category identified as "Central Denver." This causes a display identified as "add new alert for: Central Denver . . ." The operator inserts a name for this traffic-related data that is to be included by means of a control system 28 input device, such as a keyboard. Also inserted is the "alert text" which is comprised of the obtained traffic-related data and/or a modification or edited version thereof. If the traffic event or alert is of an urgent nature, it may be that supplemental traffic information should be immediately sent to all users who have requested traffic information for that geographic area and who indicated that they wanted supplemental traffic information or reports. The operator can click the box identified as "unscheduled alert" in order to immediately send such traffic information to all requesting users.

FIG. 9 also enables the operator to include a time at which any such alert expires. A default time is available, for example, 40 minutes. The default time can be extended to as long as 24 hours or designated not to expire. Once the operator submits this traffic-related data, the control system 28 processes it and stores it in the appropriate data storage 60 database. The time related to the expiring of this information begins running once this new alert or traffic-related data is submitted. After the required or default time, this processed traffic information will automatically delete from the database. Any user who is scheduled to receive traffic information during the time up to the expiration, or any user who checks his/her traffic information on the web page, will receive this traffic information or alert if it is in the geographic area that is part of the user's information or profile that identifies the traffic information being requested. Often times, the operator will edit one or more alerts or traffic-related data. For example, the operator may edit the traffic-related data to indicate that a particular traffic backup extends for two miles, whereas the previous traffic-related data indicated that the backup was for one mile.

In addition to traffic information related to geographic areas as suitably categorized, the operator can be involved in controlling transit information by adding a new transport type or adding a new transport segment(s). By selecting or clicking on "add new transport type," the operator is able to modify the identities of transport types that contribute to the traffic information, such as transit information, made available to users that request such information. For example, a rail line may be included as a transport type by the operator. One or more new transport segments may be added by the operator as well, such as new or different bus routes that may be added to the current bus schedules.

With regard to generating revenues in connection with the providing of traffic information to the users, advertisements or promotional information can be included with the traffic information. Such advertisements might advertise for a number of different advertisers and each advertiser may have one or more advertisements that are to be utilized at particular times of the day. The operator is able to include information related to the identities of any new advertiser. Relatedly, the operator can incorporate new advertisement information that is to be included with the traffic information sent to the users.

The foregoing discussion of the invention has been presented for purposes of illustration and description. Further, the description is not intended to limit the invention to the forms disclosed herein. Consequently, variation and modification commensurate with the above disclosures, within the skill and knowledge of the relevant art, are within the scope of the present invention. The embodiments described hereinabove are further intended to explain the best modes presently known of practicing the invention and to enable others skilled in the art to utilize the invention as such, or in other embodiments, and with the various modifications required by their particular application or use of the invention.

What is claimed is:

1. A method for providing traffic information, comprising:

receiving user information from which customized traffic information related to a first geographic area of a first metro area can be provided;

obtaining traffic-related data that includes first traffic-related data and second traffic-related data using a plurality of sources, said obtaining including providing automatically said first traffic-related data to a control system having at least one processor and involving manually at least a first human operator with said second traffic-related data, said second traffic-related data being input using an input device by at least the first human operator that has authorized access to said control system, and at least the first human operator making a determination that said second traffic-related data is to be associated with at least a first category related to one or more geographic areas including said first geographic area and, after said determination, at least the first human operator is involved with associating said second traffic-related data with at least said first category;

processing using said at least one processor said traffic-related data to provide processed traffic information for storage;

storing said processed traffic information using data storage;

selecting firstly at least a first subset of said processed traffic information; and sending traffic information related to said first subset of said processed traffic information to at least a first user, said traffic information sent to at least the first user relates to said first geographic area and not to a second geographic area of said first metro area that is different from said first geographic area.

2. A method, as claimed in claim 1, wherein:

said receiving includes receiving said user information from a plurality of users including the first user.

3. A method, as claimed in claim 1, wherein:

said user information includes destination information related to where said traffic information is to be sent during said sending.

4. A method, as claimed in claim 1, wherein:

said user information includes information related to said first geographic area of said first metro area and is used in controlling said traffic information to be sent during said sending to the first user.

5. A method, as claimed in claim 1, wherein:

said traffic-related data includes at least one of: geographic information related to traffic in said first geographic area, highway information related to traffic along a first traffic route and first transit information related to use of publicly available transportation.

6. A method, as claimed in claim 1, wherein:

said user information includes user information related to traffic in said first geographic area and said selecting includes using said user information related to traffic in said first geographic area to select said first subset of said processed traffic information.

7. A method, as claimed in claim 1, wherein:

said processing includes automatically correlating using said at least one processor said first traffic-related data with at least said first category.

8. A method, as claimed in claim 1, wherein:

said processing includes correlating automatically using said at least said one processor said second traffic-related data with at least said first category.

9. A method, as claimed in claim 1, wherein:

said selecting of said first subset depends on at least some of said user information including at least one of: when said traffic information is to be sent using said sending, at least said first geographic area and where said first subset is to be sent during said sending.

10. A method, as claimed in claim 1, wherein:

said obtaining step includes using at least some of the following: a public transportation source, a TV station, a radio station, a police scanner, an individual traffic watcher, a global positioning system and a speed sensor loop.

11. A method, as claimed in claim 1, wherein:

said receiving is conducted using at least a first user apparatus and said sending is conducted using said first user apparatus or a receiver apparatus different from said first user apparatus.

12. A method, as claimed in claim 1, further including:

selecting secondly a second subset of said processed traffic information from said data storage based on at least one of said second geographic area, transit information and a predetermined time.

13. A method, as claimed in claim 1, further including:

selecting by the first user transit information associated with at least a first public transportation vehicle and in which said traffic information sent to the first user includes traffic information related to said route information.

14. An apparatus for providing traffic information, comprising:

a plurality of user apparatuses including at least a first user apparatus and a second user apparatus, said first user apparatus providing first user information based on which customized traffic information for a first geographic area of a first metro area can be provided to a first user and said second user apparatus providing second user information based on which second customized traffic information for a second geographic area of the first metro area can be provided to a second user; and a control system being able to communicate with each of said plurality of user apparatuses and including at least one processor and data storage, said at least one processor receives at least said first user information, said second user information and traffic-related data, said at least one processor processes said traffic-related data to provide processed traffic information and said data storage stores said processed traffic information received from said at least one processor, said data storage also stores public transportation information including route information for at least a first public transportation vehicle, said at least one processor retrieves from said data storage at least a first subset of said processed traffic information for sending to at least said first user apparatus and a second subset of said processed traffic information for sending to at least said second user apparatus, said first subset including information related to said first geographic area and not said second geographic area and said second subset including information related to said second geographic area and not said first geographic area and at least said first subset including traffic information related to an event that can affect traffic, wherein said first user apparatus is used in selecting said public transportation information and said at least one processor provides traffic information to said first user apparatus related to said route information for the first public transportation vehicle.

15. An apparatus, as claimed in claim 14, wherein:

said control system includes an input apparatus for use in inputting said traffic-related data for use by said at least one processor and said input apparatus including at least one of a keyboard, a mouse and a microphone.

16. An apparatus, as claimed in claim 14, wherein:

said first user information includes information related to information requested by the first user, destination information for said first subset of said processed traffic information and at least a first predetermined time related to sending said first subset of said processed traffic information to the first user.

17. An apparatus, as claimed in claim 14, wherein:

said at least one processor includes software that at a first predetermined time, accesses said data storage to obtain at least some of said first user information and said first subset of said processed traffic information and in which said control system sends said first subset of said processed traffic information to the first user using a first receiver apparatus.

18. An apparatus, as claimed in claim 17, wherein:

said first receiver apparatus is different from said first user apparatus.

19. An apparatus, as claimed in claim 14, wherein:

said first user information from said first user apparatus is received automatically by said control system and at least some of said traffic-related data is received from a plurality of sources by at least one operator.

20. An apparatus, as claimed in claim 14, wherein:

said first subset of said processed traffic information is received using at least one of the following: electronic mail, digital pager, personal computer, voice mail, portable phone and text-to-voice technology.

21. An apparatus, as claimed in claim 14, wherein:

at least some of said traffic-related data is provided automatically using at least one of a speed sensor loop, a global positioning satellite system and cellular phone location technology.

22. An apparatus, as claimed in claim 14, wherein:

said route information includes stop information associated with the first public transportation vehicle.

23. An apparatus, as claimed in claim 14, wherein:

at least some of said traffic-related data is input for use by said at least one processor by a human operator having authorized access to said control system.

24. An apparatus, as claimed in claim 23, wherein:

said control system includes an input device and a software implemented web interface that is used by the human operator to enter said at least some traffic-related data.

* * * * *